(12) United States Patent
Chen et al.

(10) Patent No.: US 7,838,123 B2
(45) Date of Patent: *Nov. 23, 2010

(54) VARIABLE VAPOR BARRIER FOR MOISTURE CONTROL IN BUILDINGS

(75) Inventors: John Chu Chen, Hockessin, DE (US); Ashok Harakhlal Shah, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 769 days.

This patent is subject to a terminal disclaimer.

(21) Appl. No.: 11/451,762

(22) Filed: Jun. 13, 2006

(65) Prior Publication Data

US 2007/0283652 A1    Dec. 13, 2007

(51) Int. Cl.
  *B32B 27/10* (2006.01)
  *B32B 27/30* (2006.01)

(52) U.S. Cl. .................... 428/511; 428/292.1; 428/500; 428/514; 428/522; 428/535; 52/309.1

(58) Field of Classification Search ........................ None
See application file for complete search history.

(56) References Cited

U.S. PATENT DOCUMENTS

| | | | |
|---|---|---|---|
| 6,808,772 B2 | 10/2004 | Kunzel | |
| 6,878,455 B2 | 4/2005 | Kunzel | |
| 6,890,666 B2 | 5/2005 | Kunzel | |
| 7,442,659 B2 * | 10/2008 | Moll | ........................... 442/394 |
| 2003/0215609 A1 | 11/2003 | Burkart | |
| 2004/0103603 A1 | 6/2004 | Kunzel | |
| 2004/0103604 A1 | 6/2004 | Kunzel | |
| 2004/0103605 A1 | 6/2004 | Kunzel | |
| 2004/0103607 A1 | 6/2004 | Kunzel | |
| 2004/0245391 A1 | 12/2004 | Kunzel | |
| 2005/0124741 A1 | 6/2005 | Chen | |
| 2007/0078223 A1 * | 4/2007 | Chen et al. | ................... 525/191 |

FOREIGN PATENT DOCUMENTS

| | | |
|---|---|---|
| EP | 1 362 694 A | 11/2003 |
| WO | WO 96/33321 A1 | 10/1996 |
| WO | WO 03/042037 A1 | 5/2003 |
| WO | WO 03/044294 A1 | 5/2003 |
| WO | WO 2004/050362 A1 | 6/2004 |
| WO | WO 2005/056669 A1 | 6/2005 |

OTHER PUBLICATIONS

PCT International Search Report for International Application No. PCT/US2007/013976, filed Jun. 12, 2007, dated Feb. 21, 2008.

* cited by examiner

*Primary Examiner*—Monique R Jackson

(57) ABSTRACT

Disclosed is a variable vapor barrier for moisture control of buildings comprising or formed from a material having a moisture permeance of less than 0.1 perms (grains/ $h \cdot ft^2 \cdot$ inches of Hg) at less than 50% average humidity, such as from 10 to 50% or 20 to 40%; and a moisture permeance greater than 4, or greater than 10 perms at greater than 60% average humidity, such as from 60 to 90%, or 70 to 80%. Also disclosed are articles comprising the variable vapor barrier and methods of their use.

21 Claims, No Drawings

VARIABLE VAPOR BARRIER FOR MOISTURE CONTROL IN BUILDINGS

This invention relates to a vapor barrier having variable moisture permeance under different ambient humidity conditions for use in moisture control in buildings, to articles therewith, and to methods of their use.

BACKGROUND OF THE INVENTION

Buildings are commonly equipped with thermal insulation in order to provide comfortable living conditions inside the building. Thermal insulation has added advantages in reducing the consumption of energy and reducing carbon dioxide emissions that occurs as a result of heating and cooling buildings. These advantages have led to the installation of increasing amounts of insulation in construction of new buildings and during renovation of old buildings. Because of considerations such as appearance, cost, ease of installation and protection of the insulation, insulation is often installed in walls, ceilings and/or roofs between the interior finished surface and the exterior sheathing of the building in cavities between the framework and the interior and exterior surfaces.

In addition to insulation, buildings are also constructed with various air barrier materials that are installed between the sheathing and the exterior cladding to limit air and water infiltration into the structure of the building. These air barriers minimize heat loss through draft flow.

In addition to air barriers, vapor barriers are also used for controlling flow of moisture. For example, the moisture flow is generally from inside to outside when the exterior air is cold and dry (winter) and from outside to inside when the air is hot and humid (summer). In regions where these conditions prevail, it is common practice to use a vapor barrier such as polyethylene (PE) film on the warm side of the insulation, generally behind the gypsum wallboard, to prevent moisture diffusion from the interior heated space to the exterior cold environment. Such vapor barriers reduce the potential for moisture condensation in the interior wall cavity space as the water vapor is exposed to the cold exterior temperatures. Moisture condensation causes wood decay, promotes mold growth, reduces insulation value, and consequently must be eliminated whenever practical. Although the use of PE film as a vapor barrier reduces moisture condensation during exterior conditions of cold temperatures and low humidity, the same vapor barrier increases the likelihood of moisture condensation at the insulation-PE film interface during hot and humid exterior conditions where moisture flow is from outside to inside. Therefore, it is desirable to have a material that acts as a vapor barrier during winter but facilitates vapor permeation during hot, humid summer conditions. It is also desirable to have a vapor barrier that can become vapor permeable under humid conditions in the wall cavity caused by unexpected uncontrolled events like water leaks into the wall cavity, to facilitate drying of the wall cavity by inward moisture flow as well as outward flow.

U.S. Pat. Nos. 6,808,772; 6,878,455 and 6,890,666 disclose applications of a polyamide building liner material that has a water vapor diffusion resistance (WVDS) of from 2 to 5 meters diffusion-equivalent air space width at a relative humidity (RH) of an atmosphere surrounding the vapor barrier between 30% and 50% and a WVDS of less than 1 meter diffusion-equivalent air space width at a relative humidity between 60% and 80%. See also, U.S. Patent Application Publication 2003/0215609 (a moisture-adaptive vapor-barrier film comprising PE and acrylic ester with a WVDS of from 0.5 to 100 meters diffusion-equivalent air space width at an RH of an atmosphere surrounding the vapor barrier between 60% and 80%) and WO2002/070351 (use of ionomers for sealing insulating materials having a WVDS of from 1 to 20 meters diffusion-equivalent air space width at a RH of an atmosphere surrounding the vapor barrier of 25% and a WVDS of from 0.02 to 0.7 meter diffusion-equivalent air space width at a relative humidity of 72.5%).

SUMMARY OF THE INVENTION

This invention provides a variable vapor barrier for moisture control of buildings formed from a material or composition having a moisture permeance of less than 0.1 perms (grains/h·ft$^2$·inches of Hg) at less than 50% average humidity, such as from 10 to 50% or from 20 to 40%; and a moisture permeance greater than 4, or greater than 10 perms, at greater than 60% average humidity, such as from 60 to 90% or 70 to 80%. Average humidity below 50% is thought of as relatively dry conditions and average humidity above 60% is thought of as relatively humid conditions.

The variable vapor barrier may have a ratio of wet cup permeance to dry cup permeance greater than 100 when measured according to ASTM E96-00 at a temperature of 73° F. (23° C.), wherein wet cup permeance is determined at an average relative humidity of 75% and dry cup permeance is determined at an average relative humidity of 25%.

An embodiment of the variable vapor barrier comprises or is prepared from a composition comprising or consisting essentially of (i) one or more E/X/Y copolymers; (ii) one or more organic acids selected from carboxylic acids having fewer than 36 carbon atoms, or salts thereof; and optionally (iii) one or more optional polymer including ethylene-containing polymers or propylene-containing polymers.

The composition can be produced by combining one or more E/X/Y copolymers, one or more organic acids or salts thereof, a metal compound, and optionally one or more optional polymer to produce a mixture and heating the mixture under a condition sufficient to produce the composition.

This invention also provides a method for providing a variable vapor barrier to a building, comprising installing a variable vapor barrier as described above on at least a part of the building.

This invention also provides a method of constructing a new building or renovating an existing building, of which the improvement comprises applying a variable vapor barrier as described above to a wall, ceiling or roof of a building between the interior sheathing material and the insulation.

DETAILED DESCRIPTION OF THE INVENTION

Many previous permeable membranes are microporous; that is, they are permeable due to the presence of microscopic pores through which vapor can pass. The composition disclosed herein can be formed into a monolithic membrane that functions as a selectively permeable barrier. Monolithic membranes, in contrast to microporous membranes, have high water-entry pressure and are waterproof and liquid proof and can provide good barriers to liquid water while still allowing permeability to water vapor under appropriate conditions. Monolithic membranes are also excellent in stopping draft flow to help minimize heat loss. A monolithic membrane can also function as a barrier to odors and possess tear strength compared to microporous membranes.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present).

"Consisting essentially of" means that the recited components are essential, while smaller amounts of other components may be present to the extent that they do not detract from the operability of the present invention. The term "(meth)acrylic acid" indicates methacrylic acid and/or acrylic acid. Likewise, the term "(meth)acrylate" indicates methacrylate and/or acrylate.

Permeance is a measure of the permeability of a material to water vapor divided by its thickness in inches and can be expressed in units of Perms (grains/h·ft²·inches of Hg). The permeance of still air is 120 perms·inch (see Table 5.4, Page 158, *Thermal and Moisture Protection Manual*, Christine Beall, McGraw-Hill). Another measure of permeability is WVDS ($S_d$), which can be expressed in meters diffusion-equivalent air layer thickness. These measures can be related by the expression $3.048/S_d$=Permeance in Perms.

For illustration, the diffusion resistance expressed as $S_d$ of prior vapor barrier materials has been converted to permeance expressed in Perms and summarized below:

| Reference | | Permeance (Perms) |
|---|---|---|
| U.S. Pat. No. 6,808,772 | 0.61 to 1.52 at 30 to 50% RH | Greater than 3.1 at 60 to 80% RH |
| US2003/0215609 | — | 0.03 to 6.09 at 60 to 80% RH |
| WO2002/070351 | 0.15 to 3 at 25% RH | 4.35 to 152 at 72.5% RH |

The amount of basic metal compound capable of neutralizing acidic groups may be provided by adding the stoichiometric amount of the basic compound calculated to neutralize a target amount of acid moieties in the acid copolymer and organic acid(s) in the blend (hereinafter referred to as "% nominal neutralization" or "nominally neutralized"). Thus, sufficient basic compound is made available in the blend so that, in aggregate, the indicated level of nominal neutralization could be achieved. Nominal neutralization levels of all acid moieties in the composition are at least 70, 80, or 90%, or even 100%.

Metal compounds can include compounds of alkali metals, such as lithium, sodium or potassium, or combinations of such cations such that at least 50 mole percent of the cations present in the mixture are sodium cations. Melt processibility, for example in a blown film process, may be improved if a combination of alkali metal ions and transition metal ions and/or alkaline earth metal ions is employed. Examples include sodium or combinations of sodium and potassium, optionally including small amounts of other cations such as alkali metal ions, transition metal ions or alkaline earth ions. Compounds of note include formates, acetates, nitrates, carbonates, hydrogencarbonates, oxides, hydroxides or alkoxides of the ions of alkali metals, especially sodium and potassium, and formates, acetates, nitrates, oxides, hydroxides or alkoxides of the ions of alkaline earth metals and transition metals. Of particular note are sodium hydroxide, potassium hydroxide, sodium acetate, potassium acetate, sodium carbonate and potassium carbonate.

In E/X/Y copolymer, E is derived from ethylene, X is derived from at least one $C_3$ to $C_8$ $\alpha,\beta$-ethylenically unsaturated carboxylic acid, and Y is derived from a softening comonomer, or ionomers of the E/X/Y copolymers. X is from about 2 to about 35, 4 to 25, or 5 to 20, weight % of the E/X/Y copolymer and Y is from 0 to about 35, about 0.1 to about 35, or 5 to 30, weight % of the E/X/Y copolymer.

The organic acids can be monobasic carboxylic acids having fewer than 36 carbon atoms, or salts thereof and can be present in the composition from about 1 to about 50 weight %. The acids are optionally substituted with from one to three substituents independently selected from the group consisting of $C_1$-$C_8$ alkyl, OH, and $OR^1$ in which each $R^1$ is independently $C_1$-$C_8$ alkyl, $C_1$-$C_6$ alkoxyalkyl or $COR^2$; and each $R^2$ is independently H or $C_1$-$C_8$ alkyl.

Greater than 70%, 80% or 90% (or even 100%) acidic groups in the E/X/Y copolymers and organic acids are nominally neutralized with metal ions; and the metal ions present in the mixture can comprise at least 50 mole % sodium ions and the preponderance of the other metal ions are alkali metal ions.

The E/X/Y copolymers are acid copolymers or "direct" acid copolymers. They include an α-olefin, such as ethylene, copolymerized with at least one monomer derived from a $C_{3-8}$ $\alpha,\beta$-ethylenically unsaturated carboxylic acid. The acid copolymers can be described as E/X/Y copolymers where E is ethylene, X is derived from at least one $\alpha,\beta$-ethylenically unsaturated carboxylic acid, and Y is a softening comonomer. "Softening" means that the crystallinity is disrupted (the polymer is made less crystalline). Notable are E/X/Y copolymers wherein Y is 0 weight % of the polymer. They may optionally contain a third softening comonomer.

Examples of X include unsaturated acids such as (meth)acrylic acid, maleic acid, fumaric acid, and itaconic acid; and monoesters of fumaric acid and maleic acid (maleic half esters) including esters of $C_1$ to $C_4$ alcohols such as for example, methyl, ethyl, n-propyl, isopropyl and n-butyl alcohols.

Examples of softening comonomers for use as Y include alkyl acrylate, alkyl methacrylate, or combinations thereof wherein the alkyl groups have from 1 to 8, or 1 to 4, carbon atoms Ethylene acid copolymers with high levels of acid (X) can be produced by any methods known to one skilled in the art such as use of "co-solvent technology" disclosed in U.S. Pat. No. 5,028,674 or by employing somewhat higher pressures than those at which copolymers with lower acid levels can be prepared.

Specific acid copolymers include ethylene/(meth)acrylic acid copolymers. They also include ethylene/(meth)acrylic acid/n-butyl(meth)acrylate, ethylene/(meth)acrylic acid/isobutyl(meth)acrylate, ethylene/(meth)acrylic acid/methyl(meth)acrylate, ethylene/(meth)acrylic acid/ethyl(meth)acrylate terpolymers, or combinations of two or more thereof. Other acid copolymers include ethylene/maleic acid and ethylene/maleic acid monoester dipolymers; and ethylene/maleic acid monoester/n-butyl(meth)acrylate, ethylene/maleic acid monoester/methyl(meth)acrylate, ethylene/maleic acid monoester/ethyl(meth)acrylate terpolymers, or combinations of two or more thereof.

The acid copolymers described above can be used to prepare unmodified, melt processible ionomers used by treatment with a metal compound disclosed above. The unmodified ionomers may be nominally neutralized to any level such as about 15 to about 90% or about 40 to about 75% of the acid moieties.

The unmodified ionomers can be mixed with organic acids or salts thereof, metal compounds, and optional ethylene- or propylene-containing polymers, by any means known to one skilled in the art, to prepare compositions, Examples of organic acids can be monobasic, dibasic, or polybasic carboxylic acids including $C_4$ to less than $C_{36}$ (such as $C_{34}$, $C_{4-26}$, $C_{6-22}$, or $C_{12-22}$). At 100% nominal neutralization (i.e., sufficient metal compound is added such that all acid moieties in the copolymer and organic acid are nominally neutralized), volatility is not an issue. As such, organic acids with lower carbon content can be used. It is preferred that the organic acid (or salt) be non-volatile (not volatilize at temperatures of melt blending of the agent with the acid copolymer) and non-migratory (not bloom to the surface of the polymer under normal storage conditions (ambient temperatures)). Examples of organic acids include, but are not limited to, caproic acid, caprylic acid, capric acid, lauric acid, stearic acid, isostearic acid, behenic acid, erucic acid, oleic acid, and linoleic acid. Naturally derived organic fatty acids such as palmitic, stearic, oleic, erucic, behenic acids, or combinations of two or more thereof.

Saturated organic acids, such as stearic acid and behenic acid, may reduce organoleptic properties of the composition.

Acids substituted with at least one $C_{1-8}$ alkyl group are branched acids. Saturated, branched organic acids are acids comprising at least one CH (methenyl) moiety and at least two $CH_3$ (methyl) moieties. In contrast, saturated, linear organic acids (e.g., behenic acid) are acids comprising only one $CH_3$ and no CH moieties.

"Hydroxy-substituted organic acids" includes not only those organic acids substituted with a hydroxyl (—OH) moiety, but also derivatives wherein the H of the hydroxyl moiety is replaced by $R^1$ moieties as defined above. Hydroxy-substituted organic acid can be substituted with one OH or one $OR^1$. Isostearic acid and 12-hydroxystearic acid are examples of organic acids substituted with one alkyl group and one OH, respectively.

Salts of any of these organic acids may include the alkali metal salts, such that the metal ions present in the final composition comprise at least 50% sodium ions, including sodium and potassium salts. Small amounts of salts of alkaline earth metal and/or or transition metal ions may be present in addition to alkali metal salts.

The composition optionally comprise from about 0.1 to about 25, to about 15, or to about 10, weight %, or from 1 to about 5 weight % based on the composition, of one or more ethylene-containing polymers or propylene-containing polymers. For example, when the composition comprises 2 or 5 weight % to 25 weight % organic acids, the optional polymers may be present in the composition from 10 to 25 weight %. Blending with such polymers may provide better processibility, improved toughness, strength, flexibility, compatibility of the blend when adhering to a substrate as described below.

The optional polymers can include PE homopolymers and copolymers, polypropylene (PP) homopolymers, PP copolymers, or combinations of two or more thereof.

PE homopolymers and copolymers can be prepared by a variety of methods, for example, the well-known Ziegler-Natta catalyst polymerization (e.g., U.S. Pat. No. 4,076,698 and U.S. Pat. No. 3,645,992), metallocene catalyzed polymerization, Versipol® catalyzed polymerization and by free radical polymerization. The polymerization can be conducted as solution phase processes, gas phase processes, and the like. Examples of PE polymers can include high density PE (HDPE), linear low density PE (LLDPE), low density PE (LDPE), very low or ultralow density polyethylenes (VLDPE or ULDPE), lower density PE made with metallocene having high flexibility and low crystallinity (mPE). Metallocene technology is described in, for example, U.S. Pat. Nos. 5,272,236; 5,278,272, 5,507,475, 5,264,405, and 5,240,894.

The densities of polyethylenes suitable can range from about 0.865 g/cc to about 0.970 g/cc. Linear polyethylenes can incorporate α-olefin comonomers such as butene, hexene or octene to decrease density to within the density range so described. For example, a copolymer used may comprise a major portion (by weight) of ethylene that is copolymerized with another α-olefin having about 3 to about 20 carbon atoms and up to about 20% by weight of the copolymer. Other α-olefins are propylene, 1-butene, 1-hexene, 4-methyl-1-pentene, 1-octene, 1-decene, 1-tetradecene, 1-octadecene, or in admixtures of two or more.

The PE copolymer may also be an ethylene propylene elastomer containing a small amount of unsaturated compounds having a double bond. The term "PE" when used herein is used generically to refer to any or all of the polymers comprising ethylene described above.

Ethylene copolymers having small amounts of a diolefin component such as butadiene, norbornadiene, hexadiene and isoprene are also generally suitable. Terpolymers such as ethylene/propylene/diene monomer (EPDM) are also suitable.

Polypropylene polymers include homopolymers, random copolymers, block copolymers and terpolymers of propylene. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene.

Polypropylene homopolymers or random copolymers can be manufactured by any known process (e.g., using Ziegler-Natta catalyst, based on organometallic compounds, or on solids containing titanium trichloride).

Block copolymers can be manufactured similarly, except that propylene is generally first polymerized by itself in a first stage and propylene and additional comonomers such as ethylene are then polymerized, in a second stage, in the presence of the polymer obtained during the first. Each of these stages can be carried out, for example, in suspension in a hydrocarbon diluent, in suspension in liquid propylene, or else in gaseous phase, continuously or noncontinuously, in the same reactor or in separate reactors. See, e.g., chapters 4.4 and 4.7 of the work "Block Copolymers" edited by D. C. Allport and W. H. Janes, published by Applied Science Publishers Ltd., 1973.

The optional polymer may also include ethylene copolymers obtained from copolymerization of ethylene with at least one polar monomer such as ethylene/vinyl acetate copolymers, ethylene/acrylic ester copolymers, ethylene/methacrylic ester copolymers, ethylene/vinyl acetate/CO copolymers, ethylene/acrylic ester/CO copolymers, ethylene/maleic anhydride copolymers, and/or mixtures of any of these.

Optionally, the composition may comprise at least one ethylene/vinyl acetate copolymer, which includes copolymers derived from the copolymerization of ethylene and vinyl acetate or the copolymerization of ethylene, vinyl acetate, and an additional comonomer.

The relative amount of the vinyl acetate comonomer incorporated into ethylene/vinyl acetate copolymers can vary from a few (e.g., 3) weight % up to as high as 45 weight % of the total copolymer or even higher.

The ethylene/vinyl acetate copolymer may have 2 to 45 or 6 to 30, weight % derived from vinyl acetate. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer may have a melt flow rate, measured in accordance with ASTM D-1238, of from 0.1 to 60 g/10 or 0.3 to 30 g/10 minutes. A mixture of two or more different ethylene/vinyl acetate copolymers can be used.

Optionally, the composition may comprise at least one ethylene/alkyl(meth)acrylate copolymer, which includes copolymers of ethylene and one or more $C_{1-8}$ alkyl(meth)acrylates. Examples of alkyl(meth)acrylates include methyl acrylate, ethyl acrylate and butyl acrylate. Examples of the copolymers include ethylene/methyl acrylate copolymer ethylene/ethyl acrylate copolymer, ethylene/butyl acrylate copolymer, or combinations of two or more thereof.

Alkyl(meth)acrylate may be incorporated into an ethylene/alkyl(meth)acrylate copolymer a few weight % up to as high as 45 weight % of the copolymer or even higher such as 5 to 45, 10 to 35, or 10 to 28, weight %. Frequently used alkyl group is methyl, ethyl, iso-butyl, or n-butyl.

Ethylene/alkyl(meth)acrylate copolymers can be prepared by processes well known to one skilled in the art using either autoclave or tubular reactors. See, e.g., U.S. Pat. Nos. 2,897,183; 3,404,134; 5,028,674; 6,500,888; and 6,518,365. See also, Richard T. Chou, Mimi Y. Keating and Lester J. Hughes, "*High Flexibility EMA made from High Pressure Tubular Process*", Annual Technical Conference—Society of Plastics Engineers (2002), 60$^{th}$ (Vol. 2), 1832-1836. The entire disclosure of all references are incorporated by reference. Because the methods for making an ethylene/Alkyl(meth)acrylate copolymer are well known, the description of which is omitted herein for the interest of brevity. Tubular reactor produced ethylene/alkyl(meth)acrylate copolymers, are commercially available from E. I. du Pont de Nemours and Company, Wilmington, Del. (DuPont) such as Elvaloy®. The ethylene/alkyl(meth)acrylate copolymers can vary significantly in molecular weight and the selection of the melt index (MI) grade of polymer can be by balancing the properties of the ethylene/alkyl(meth)acrylate copolymer with those of the neutralized organic acid and ethylene acid copolymer to provide the desired mix of permeability and structural properties needed for a specific variable vapor barrier construction. A mixture of two or more different ethylene/alkyl(meth)acrylate copolymers can be used. Of note is a composition wherein at least one ethylene/alkyl(meth)acrylate copolymer is present in up to 15 weight %.

An anhydride-modified polymer can be used as the optional polymer and comprise a copolymer having an unsaturated dicarboxylic acid anhydride repeating unit. Monomers providing the unsaturated dicarboxylic acid anhydride repeating unit include maleic anhydride, citraconic anhydride, itaconic anhydride, tetrahydrophthalic anhydride, or combinations of two or more thereof. The modified copolymer can be obtained by known techniques, such as a process in which a polymer selected from a PE homopolymer or copolymer, a polypropylene homopolymer or copolymer, an ethylene/vinyl acetate copolymer or an ethylene/alkyl acrylate copolymer, as disclosed above, is dissolved in an organic solvent with an unsaturated dicarboxylic acid anhydride or its functional equivalent and a radical generator, followed by heating with stirring; and a process in which all the components are fed to an extruder to provide a maleic-anhydride grafted ethylene copolymer. Grafting processes provide copolymers with from 0.1 to 3 weight % of anhydride units. These graft copolymers are available commercially from DuPont under the Fusabond® or Bynel® brand names.

Ethylene copolymers that include reactive functional groups such as maleic anhydride also can be readily obtained by a high-pressure free radical process, in which an olefin comonomer and a functional comonomer are directly copolymerized. A high-pressure process suitable for use in the practice of the present invention is described, for example, in U.S. Pat. No. 4,351,931. This process allows for preparation of copolymers with greater than 3 weight %, such as up to about 15 weight %, of anhydride units. These copolymers include olefin/maleate copolymers such as ethylene/maleic anhydride.

The composition disclosed can be produced by any means known to one skilled in the art. It is substantially melt-processible and can be produced by combining one or more E/X/Y copolymers, one or more organic acids or salts thereof, from 0.1 to 10 weight % of a basic metal compound capable of nominally neutralizing greater than 70%, 80%, or 90%, or even up to 100% of acidic groups in the E/X/Y copolymer and organic acids, and optionally 0.1 to 25 weight % of one or more optional polymer to produce a mixture; heating the mixture under a condition sufficient to produce the composition. Heating can be carried out under a temperature in the range of from about 80 to about 350, about 100 to about 320, or 120 to 300° C. under a pressure that accommodates the temperature for a period from about 30 seconds to about 2 or 3 hours. For example, the composition can be produced by melt-blending an E/X/Y copolymer and/or ionomer thereof with one or more organic acids or salts thereof; concurrently or subsequently combining a sufficient amount of a basic metal compound capable of neutralization of the acid moieties to nominal neutralization levels greater than 70, 80, 90%, to near 100%, or to 100%; and optionally, combining an optional polymer disclosed above. A salt blend of components can be made or the components can be melt-blended in an extruder. For example, a Werner & Pfleiderer twin-screw extruder can be used to mix and treat the acid copolymer and the organic acid (or salt) with the metal compound at the same time. It is desirable that the mixing is conducted so that the components are intimately mixed, allowing the metal compound to neutralize the acidic moieties. Actual neutralization levels can be determined using infra red spectroscopy by comparing an absorption peak attributable to carboxylate anion stretching vibrations at 1530 to 1630 cm$^{-1}$ and an absorption peak attributable to carbonyl stretching vibrations at 1690 to 1710 cm$^{-1}$.

Treatment of acid copolymers and organic acids with metal compounds in this manner (concurrently or subsequently), such as without the use of an inert diluent, may produce composition without loss of processibility or properties such as toughness and elongation to a level higher than that which would result in loss of melt processibility and properties for the ionomer alone.

The composition can additionally comprise small amounts of additives commonly used and well known in the adhesive art including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. These additives are described in the Kirk Othmer *Encyclopedia of Chemical Technology*.

These additives may be present in the compositions in quantities ranging from 0.01 to 15, 0.01 to 10, or 0.01 to 5, weight %. The incorporation of the additives can be carried out by any known process such as, for example, by dry blending, by extruding a mixture of the various constituents, by the conventional masterbatch technique, or the like.

The organic acids or salts thereof can be present in a range of about 2 to about 50 (alternatively, about 4 to about 40, about 4 to 30, about 4 to 20, or about 4 to 15) parts per hundred (pph) by weight of the ethylene $\alpha,\beta$-ethylenically unsaturated $C_{3-8}$ carboxylic acid copolymer(s) or ionomer(s) thereof.

The variable vapor barrier, or humidity-adaptive smart vapor barrier, uses as an essential material one that has a permeance (water vapor diffusion) which is dependent on the ambient humidity and which has sufficient strength and toughness for use in buildings as they are being built or renovated. In the case of an average humidity in the range below 50%, such as from 10 to 40%, or from 30 to 50%, of the atmosphere surrounding the variable vapor barrier, the material used for the variable vapor barrier, in the form of a film or as a coating or laminate on a carrier material, can have a moisture permeance of less than 0.1 perms. The material can also have a moisture permeance greater than 4 or 10 perms in the case of an average humidity in the range above 60%, such as from 60 to 90%, or from 70 to 80%, as is typical for the summer months, for example.

This humidity-dependent behavior leads to a lower permeance being achieved under winter conditions than under summer conditions. In this way, the variable vapor barrier material is effective in preventing moisture from diffusing from the interior of the building into the wall cavity and condensing into liquid water under winter conditions. Under summer conditions, such as high exterior humidity, the humidity-dependent behavior of the material provides moisture flow out of the wall cavity in both directions (particularly into the air-conditioned interior of the building) when needed, to facilitate a drying out process and to avoid water condensation in the wall cavity due to cooling by the building air conditioning. This behavior fosters peak insulation performance and reduces the risk of damage to building components due to excess moisture retention.

In another embodiment, the variable vapor barrier may be applied to a substrate comprising a carrier material. For example, the variable vapor barrier may be applied as a coating or a laminate to the carrier material. Alternatively, a film comprising the variable vapor barrier composition may be laminated to a substrate of the carrier material. Substrate can be any materials providing support, shape, esthetic effect, protection, surface texture, bulk volume, weight, or combinations of two or more thereof to enhance the functionality and handability of variable vapor barrier composition.

The variable vapor barrier can be applied between the interior sheathing and the insulating material in a wall, ceiling and/or roof of a building in accordance with this invention. The variable vapor barrier can also be used with metal roofs or timber post constructions and can also lead to a reduction in building costs along with an improvement in moisture and temperature control.

The variable vapor barrier can be a film that can be applied as part of the wall, ceiling or roof construction of a building (e.g., the film may be attached to the framing members so that the film is between the insulating material and the interior sheathing).

The variable vapor barrier can also be part of a structural component of a house or building that has a carrier material for the variable vapor barrier composition For example, the barrier, either in the form of a film or combined with a substrate, can be applied to a wall, ceiling or roof of a building between the interior sheathing material (such as gypsum wallboard) and the insulation. Articles comprising the composition and a substrate can be used to provide structural components that can be used in the construction or renovation of a building. The variable vapor barrier composition may be used as a surface for building panels or as a backing sheet for insulation. Also, films and structures prepared from the composition have sufficient strength and toughness for use in buildings as they are being built or renovated. When used as part of a building, the variable vapor barrier can be applied between the interior sheathing and the insulating material in a wall, ceiling and/or roof of a building in accordance with the invention. It can also be used with metal roofs or timber post constructions and can also lead to a reduction in building costs along with an improvement in moisture and temperature control.

Cellulose materials such as paper webs (for example Kraft paper), membranes made from synthetic fiber spun fabrics such as nonwoven textiles, or even perforated films having large percentages of open areas such as perforated PE films, may be used as materials for the carrier(s), for example. These carrier materials may be reinforced with fibers. Other examples of suitable carrier materials for purposes of the present invention include particle board, chip board, oriented strand board, plywood paneling, gypsum board (standard or fiber reinforced), fiber board, cement board, cementitious wood wool board, calcium silica board, fiber insulation batts or slabs, foam insulation slabs, cloth, or combinations of two or more thereof. The variable vapor barrier itself may be applied to any of these carrier materials as a film or membrane or as a coating (via extrusion coating, spraying, painting or other appropriate application methods).

Of note is a variable vapor barrier wherein at least one layer of carrier material is thermal insulation selected from the group consisting of fiber insulation batts, fiber insulation slabs, foam insulation slabs, or combinations of two or more thereof. The at least one layer can also be gypsum board, a cellulose material such as Kraft paper, a nonwoven textile, or combinations of two or more thereof.

For example, the variable vapor barrier material is applied to a carrier material as a film, a coating or a laminated layer. The coating or laminate can be applied to one side or both sides of the carrier material but, in special cases, it can also be accommodated between two layers of the carrier material in a sandwich-like manner. In the latter embodiment, the coating or laminate material is effectively protected from both sides from mechanical wear and it can therefore ensure the desired water vapor diffusion properties over an extended period of time. To avoid hindering drying, the carrier of these embodiments is such that the carrier material has a water vapor diffusion that is greater than the water vapor diffusion of the variable vapor barrier material so that the water vapor diffusion characteristics of the structure are essentially provided by the variable vapor barrier material. Several such layer assemblies can also be assembled one above the other.

In the case where the carrier material is coated or laminated on one side, this coating or laminate can be applied to the side on which little or no protection is required against mechanical influences. The installation of the variable vapor barrier in accordance with the invention can take place in such a way in this case that the protective carrier material points toward the side facing the room.

Of note is an embodiment wherein the variable vapor barrier material is applied to a paper web by, for example but not limitation, extrusion coating. For example, extrusion coating the variable vapor barrier material onto paper can be done as follows: dried granulates of the blend (and granulates of compositions for other layers, if present) are melted in single screw extruder(s). The molten polymer(s) are passed through a flat die to form a molten polymer curtain wherein the compositions of the individual layers are present in a laminar flow. The molten curtain drops onto the moving paper substrate to be immediately pressed into that substrate and quenched by a quench drum.

A film of the variable vapor barrier material can also be laminated to a paper web by means of an inner layer applied in molten form to adhere the film to the substrate. The process involves laying down a molten curtain of the inner layer composition between the film and the substrate moving at high speeds as they come into contact with a cold (chill) roll. The melt curtain is formed by extruding the inner layer composition through a flat die.

Use of paper coated with the variable vapor barrier material is particularly advantageous for production of building materials in continuous processes wherein the coated paper is supplied as a continuous web and is incorporated as part of a multilayer structure. An example embodiment further comprises insulation batts or slabs, wherein the paper coated with the variable vapor barrier is a facing sheet for the insulation. In another embodiment, the coated paper can be applied as a backing sheet for a building panel comprising, for example but not limitation, particle board, chip board, oriented strand board, plywood paneling, gypsum board (standard or fiber reinforced), fiber board, cement board, cementitious wood wool board, or calcium silica board.

These embodiments allow for the installation of the variable vapor barrier and an additional building material, such as insulation or a building panel, in a single operation. In an alternative embodiment, a fiberglass batt may be encased in an envelope prepared from a variable vapor barrier film of this invention. This embodiment also allows for the installation of insulation and the variable vapor barrier, such as in between the framing members in a wall cavity, in a single operation.

The following Examples are presented to illustrate the invention, but are not meant to be unduly limiting.

EXAMPLES

To illustrate variable moisture permeance associated with a film layer, cast films were prepared from the materials listed below.

EMAA-1: An ethylene/methylacrylic acid (19 weight %) copolymer with MI of 300 g/10 minutes.
EMA-1: An ethylene/methyl acrylate (24 weight %) copolymer with MI of 20 g/10 minutes.
HSA: 12-hydroxystearic acid commercially supplied by ACME-Hardesty Co.
Base-1: A blend of 59.5 weight % $Na_2CO_3$ in an ethylene/methylacrylic acid (10 weight %) copolymer with MI of 450 g/10 minutes.

The materials were melt-blended in a twin-screw extruder at 20 lb/h (about 9 kg/h) throughput rate to provide compositions summarized in Table 1 below. The compositions were cast into films of 2 to 2.5 mils thickness via a 28 mm W&P twin screw extruder.

For comparison, various known building membranes were tested. They include a nylon 6 vapor barrier film, commercially available as Membrain® from CertainTeed® (Comparative Example C4); PE film, commercially available as Tyvek® Home Wrap from DuPont (Comparative Example C5); and flashspun HDPE nonwoven (Comparative Example C6). In the Tables, "NA" stands for "not applicable".

TABLE 1

| Example | Polymer (weight %) | Second Polymer (weight %) | HSA (wt %) | Base-1 (wt %) | Nominal Neutralization |
|---|---|---|---|---|---|
| 1 | EMAA-1 (81.6) | 0 | 3.40 | 15.0 | 88 |
| 2 | EMAA-1 (73.70) | 0 | 10.05 | 16.25 | 93 |
| 3 | EMAA-1 (71.55) | EMA-1 (10.71) | 3.43 | 14.31 | 95 |
| C4 | Nylon 6 (100) | NA | NA | NA | NA |
| C5 | PE (100) | NA | NA | NA | NA |
| C6 | HDPE (100) | NA | NA | NA | NA |

The moisture permeance was measured for each cast film using protocols according to ASTM E 96-00. Dry Cup permeance was measured according to Procedure A, using an average relative humidity (RH) of 25%, with the RH on one side of the film at 0% and the RH on the other side at 50% at a temperature of 73° F. (23° C.). Wet Cup permeance was measured according to Procedure B, using an average RH of 75%, with the RH on one side of the film at 50% and the RH on the other side at 100% at a temperature of 73° F. (23° C.).

The resulting data expressed as Permeance are presented in Table 2 below. In Table 2, "Ratio" is the Wet cup permeance divided by the Dry cup permeance and is an indication of the variability in permeance for the different humidity protocols.

TABLE 2

| | Measured Permeance (perms) | | | Calculated Permeance For 4X thickness | |
|---|---|---|---|---|---|
| Example | Dry cup | Wet cup | Ratio | Dry cup | Wet cup |
| 1 | 0.26 | 48.1 | 185 | 0.07 | 12.0 |
| 2 | 0.29 | 48.4 | 167 | 0.07 | 12.1 |
| 3 | 0.38 | 47.1 | 124 | 0.095 | 11.8 |
| C4 (6 mils) | 0.63 | 10.5 | 17 | NA | NA |
| C5 (6 mils) | 0.07 | 0.16 | 2.3 | NA | NA |
| C6 | 30.7 | 39.9 | 1.3 | NA | NA |

Table 2, and particularly the ratio of wet cup to dry cup permeance, reveals that the permeance of PE film (C5) and flashspun HDPE (C6) were relatively unaffected by changes in humidity. PE film provided low permeance while Flashspun® HDPE provided somewhat higher permeance. Nylon 6 film (C4) provided some variability in permeance depending on humidity, with a wet cup to dry cup ratio less than 20. Compositions of this invention had excellent variability, as evidenced by ratios of wet cup to dry cup permeance of over 100.

The invention claimed is:
1. An article comprising a structure component and a monolithic film wherein
the monolithic film is a variable vapor barrier;
the structural component is a wall, ceiling, roof, insulation, or sheathing material;

the barrier has a moisture permeance of less than 0.1 perms at less than 50% average humidity and a moisture permeance greater than 10 perms at greater than 60% average humidity;

the film is made from a composition and has a ratio of wet cup permeance to dry cup permeance greater than 100, measured according to ASTM E 96-00 at a temperature of 73° F. (23° C.); wet cup permeance is determined at an average relative humidity of 75% and dry cup permeance is determined at an average relative humidity of 25%;

the composition consists essentially of or is produced from one or more E/X/Y copolymers and one or more organic acids having fewer than 36 carbon atoms, or salts thereof;

E is derived from ethylene, X is present in about 2 to about 35 weight % of the copolymer and is derived from at least one $C_3$ to $C_8$ $\alpha,\beta$-ethylenically unsaturated carboxylic acid, and Y is present in 0 to about 35 weight % of the copolymer and is derived from a softening comonomer, or ionomers of the E/X/Y copolymers;

the organic acid or salt thereof is present in the composition from about 1 to about 50 weight % of the composition and the organic acid is optionally substituted with from one to three substituents independently selected from the group consisting of $C_1$-$C_8$ alkyl group, OH group, and $OR^1$ group;

each $R^1$ is independently $C_1$-$C_8$ alkyl group, $C_1$-$C_6$ alkoxyalkyl group, or $COR^2$ group;

each $R^2$ is independently H or $C_1$-$C_8$ alkyl group; and greater than 70% acidic groups in the E/X/Y copolymer and the organic acid are nominally neutralized with metal ions; and the metal ions comprise at least 50 mole % sodium ions and the balance of the metal ions are other alkali metal ions.

2. The article of claim 1 wherein the monolithic film is a member between the insulation and an interior sheathing material, a surface of the structural component, or a backing sheet of the insulation.

3. The article of claim 2 wherein the monolithic film is coated or laminated on or with a carrier; the carrier is perforated film, particle board, chip board, oriented strand board, plywood paneling, gypsum board, fiber reinforced gypsum board, fiber board, cement board, cementitious wood wool board, calcium silica board, fiber insulation batt or slab, foam insulation slab, nonwoven textile, fiber-reinforced cellulose, paper, cloth, or combinations of two or more thereof.

4. The article of claim 3 wherein the organic acid is stearic acid, behenic acid, substituted with one alkyl group, or isostearic acid.

5. The article of claim 3 wherein the carrier is paper, fiber insulation batt or slab, foam insulation slab, or nonwoven textile.

6. The article of claim 3 wherein Y is present in from about 0.1 to about 35 or about 5 to 30, weight %, based on the copolymer.

7. The article of claim 5 wherein greater than 80% or 90% of acidic groups in the E/X/Y copolymer and the organic acid are nominally neutralized with the metal ions.

8. The article of claim 3 wherein the composition consists essentially of, or is produced from, the E/X/Y copolymer, the organic acid, and 0.1 to 25 weight %, based on the composition, of one or more optional polymer including ethylene-containing polymers, propylene-containing polymers, or combinations thereof; the ethylene-containing polymers or propylene-containing polymers includes polyethylene, ethylene propylene copolymers, ethylene/propylene/diene monomer terpolymers, ethylene copolymers, or combinations of two or more thereof; the polyethylene includes high density polyethylene, low density polyethylene, linear low density polyethylene, ultra-low density polyethylene, metallocene polyethylene, or combinations of two or more thereof; and the ethylene copolymer is derived from ethylene and at least one comonomer selected from the group consisting of alkyl (meth)acrylate, vinyl acetate, carbon monoxide, and dicarboxylic acid anhydrides.

9. The article of claim 8 wherein greater than 80% or 90% of acidic groups in the E/X/Y copolymer and the organic acid are nominally neutralized with the metal ions.

10. The article of claim 9 wherein the optional polymer includes at least one ethylene/alkyl (meth)acrylate copolymer.

11. The article of claim 10 wherein the at least one ethylene/alkyl (meth)acrylate copolymer is present in up to 15 weight %; the carrier has two or more layers; and at least one layer of the carrier has a water vapor diffusion greater than the water vapor diffusion of the variable vapor barrier.

12. The article of claim 5 wherein the carrier is the paper.

13. The article of claim 12 wherein the paper further comprises or has coated thereon insulation batts or slabs wherein the paper is a facing sheet for the insulation.

14. The article of claim 13 wherein the paper is a backing sheet for particle board, chip board, oriented strand board, plywood paneling, gypsum board, fiber board, cement board, cementitious wood wool board, or calcium silica board.

15. A carrier having coated or laminated thereon a monolithic film wherein the carrier includes one or more perforated films, particle board, chip board, oriented strand board, plywood paneling, gypsum board, fiber reinforced gypsum board, fiber board, cement board, cementitious wood wool board, calcium silica board, fiber insulation batts or slabs, foam insulation slabs, nonwoven textiles, fiber-reinforced cellulose, paper, cloth, or combinations of two or more thereof; the monolithic film is as recited in claim 9; and the carrier optionally comprises a substrate.

16. The carrier of claim 15 wherein the article is included in a structural component for construction or renovation of a building.

17. The carrier of claims 16 wherein at least one layer of the article is thermal insulation, gypsum board, fiber-reinforced cellulose, fiber-reinforced cellulose, nonwoven textile, or combinations of two or more thereof; and the thermal insulation includes fiber insulation batt, fiber insulation slab, foam insulation slab, or combinations of two or more thereof.

18. A method comprising applying a monolithic film to a building or a portion thereof whereby the monolithic film provides a variable vapor barrier to the building; the monolithic film is as recited in claim 3; the monolithic film is optionally coated or laminated to a carrier or at least one layer of a carrier; and the carrier is perforated film, particle board, chip board, oriented strand board, plywood paneling, gypsum board, fiber reinforced gypsum board, fiber board, cement board, cementitious wood wool board, calcium silica board, fiber insulation batt or slab, foam insulation slab, nonwoven textile, fiber-reinforced cellulose, paper, cloth, or combinations of two or more thereof.

19. The method of claim 18 wherein the monolithic film comprises the carrier and at least one layer of the carrier has a water vapor diffusion greater than the water vapor diffusion of the variable vapor barrier.

20. The method of claim 19 wherein the carrier has at least two layers and the monolithic film is optionally sandwiched between the two layers.

21. The method of claim 20 comprising applying the carrier to a wall, ceiling or roof of the building between the interior sheathing material and the insulation of the wall, the ceiling, or the roof.

* * * * *